United States Patent [19]

Galich

[11] Patent Number: 4,653,087

[45] Date of Patent: Mar. 24, 1987

[54] STEREO INTERFACE TELEPHONE RING DETECTOR

[76] Inventor: Victor J. Galich, 939 Tenth St., Huntington Beach, Calif. 92648

[21] Appl. No.: 311,005

[22] Filed: Oct. 13, 1981

Related U.S. Application Data

[63] Continuation of Ser. No. 120,711, Feb. 11, 1980, abandoned.

[51] Int. Cl.⁴ ............................................ H04M 11/08
[52] U.S. Cl. ................................. 379/110; 379/373
[58] Field of Search ............... 179/2 B, 2 TV, 1 MN, 179/1 SW, 1 TV, 84 T, 84 R, 156 R, 182 R, 179/182 A, 2 A; 340/384 E

[56] References Cited

U.S. PATENT DOCUMENTS

| | | | |
|---|---|---|---|
| 1,775,567 | 9/1930 | Lewis | 179/2 B |
| 2,766,378 | 10/1956 | Sundin et al. | 179/1 SW |
| 3,446,976 | 5/1969 | Shaw | 179/2 B X |
| 3,532,823 | 10/1970 | Ellis | 179/2 B |
| 3,867,585 | 2/1975 | Morstadt | 179/84 T |
| 4,099,936 | 5/1978 | Tech | 179/1 MN |
| 4,243,973 | 1/1981 | Sandidge | 179/2 A X |
| 4,338,492 | 7/1982 | Snopko | 179/2 TV |

FOREIGN PATENT DOCUMENTS 2002995  2/1979  United Kingdom ............ 179/2 TV

Primary Examiner—Aristotelis M. Psitos
Attorney, Agent, or Firm—Stetina and Brunda

[57] ABSTRACT

A stereo interface telephone ring detector device is disclosed which generates a tone through a headphone set of a stereo unit in response to an incoming telephone signal to audibly alert a stereo listener of the presence of the telephone call. The incoming telephone signal is rectified and coupled to both tone generating means and switching means whereby the stereo signal to the headphone set is momentarily interrupted and substituted with a modulated tone signal.

2 Claims, 3 Drawing Figures

STEREO INTERFACE TELEPHONE RING DETECTOR

This is a continuation of application Ser. No. 120,711 filed Feb. 11, 1980, now abandoned.

BACKGROUND OF THE PRESENT INVENTION

The present invention relates generally to telephone ring detectors, and more particularly to telephone ring detectors which may be utilized as an interface between a telephone and stereo unit to generate a modulated tone into a headphone set of the stereo unit in response to an incoming telephone signal.

In recent years, manufacturing technology in stereo component systems has progressed to a point wherein the majority of the purchasing public utilize home stereo systems. This widespread use has resulted in both the leisure time listener as well as the avid audiofile demanding more sophisticated, low distortion, sound reproduction. To meet this performance demand, many listeners have begun utilizing stereo headphone sets which, due to their close proxmity and encapsulating position about the ears of a listener, permit the maximum stereo effect to be achieved with a minimum component equipment cost.

Although the use of stereo headphones significantly improves reproduction sound quality, it severely limits the awareness of the user to external audible stimuli, such as a telephone call. Thus, when listening to recorded music upon a headphone set, heretofore a user had to rely solely upon visual observation to be aware of external stimuli which, with respect to incoming telephone calls, was totally inadequate.

Although various telephone ring detector devices have recently been developed and made available in the marketplace, the majority of such ring detectors have been utilized exclusively in telephone answering circuitry wherein, upon detecting an incoming telephone signal, a prerecorded announcement is initiated and a message subsequently recorded from the calling party. As such, the prior art telephone ring detecting devices have not been utilized to alert an occupant of an incoming call, but rather to permit an incoming telephone call to be answered automatically without the presence of the user.

Additionally, the existing prior art detecting circuits have typically comprised high technology, sophisticated equipment which, due to its relatively high initial investment and maintenance costs, has been utilized primarily in commercial telephone applications. Further, such prior art detectors have been incapable of being adapted to provide an interface between conventional telephones and home stereo units. As such, there exists a substantial need for a relatively low cost stereo interface telephone ring detector which may be utilized to automatically alert a stereo listener of an incoming telephone call.

SUMMARY OF THE PRESENT INVENTION

The present invention specifically addresses the above-referenced need and comprises a stereo interface telephone ring detector which may be utilized with a home stereo unit and a conventional telephone to alert a stereo listener to an incoming telephone call.

Specifically, the present invention comprises a compact, relatively low cost telephone ring detection device which generates an audible tone through a stereo headphone set in response to an incoming telephone signal. In the preferred embodiment, the incoming telephone signal is rectified and applied simultaneously to two circuit branches of the apparatus, one of which generates a modulated audible tone, and the other of which automatically switches between the stereo signal and the audible tone. By such an arrangement, the stereo signal applied to the headphone set is momentarily discontinued or interrupted and replaced with a modulated tone, whereby the user is audibly alerted of the incoming telephone call.

The present invention additionally is adapted to utilize standard stereo and telephone plug connectors to permit rapid manual installation of the device between the telephone and home stereo unit. Further, once installed, the apparatus may be placed in an inoperative mode without affecting the normal operation of the stereo unit, telephone, or headphones. In addition, the apparatus includes effective isolation means which prevents any damaging feedback of transient signals onto the telephone line and includes a convenient momentary test switch to rapidly indicate whether the device is functioning properly.

DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
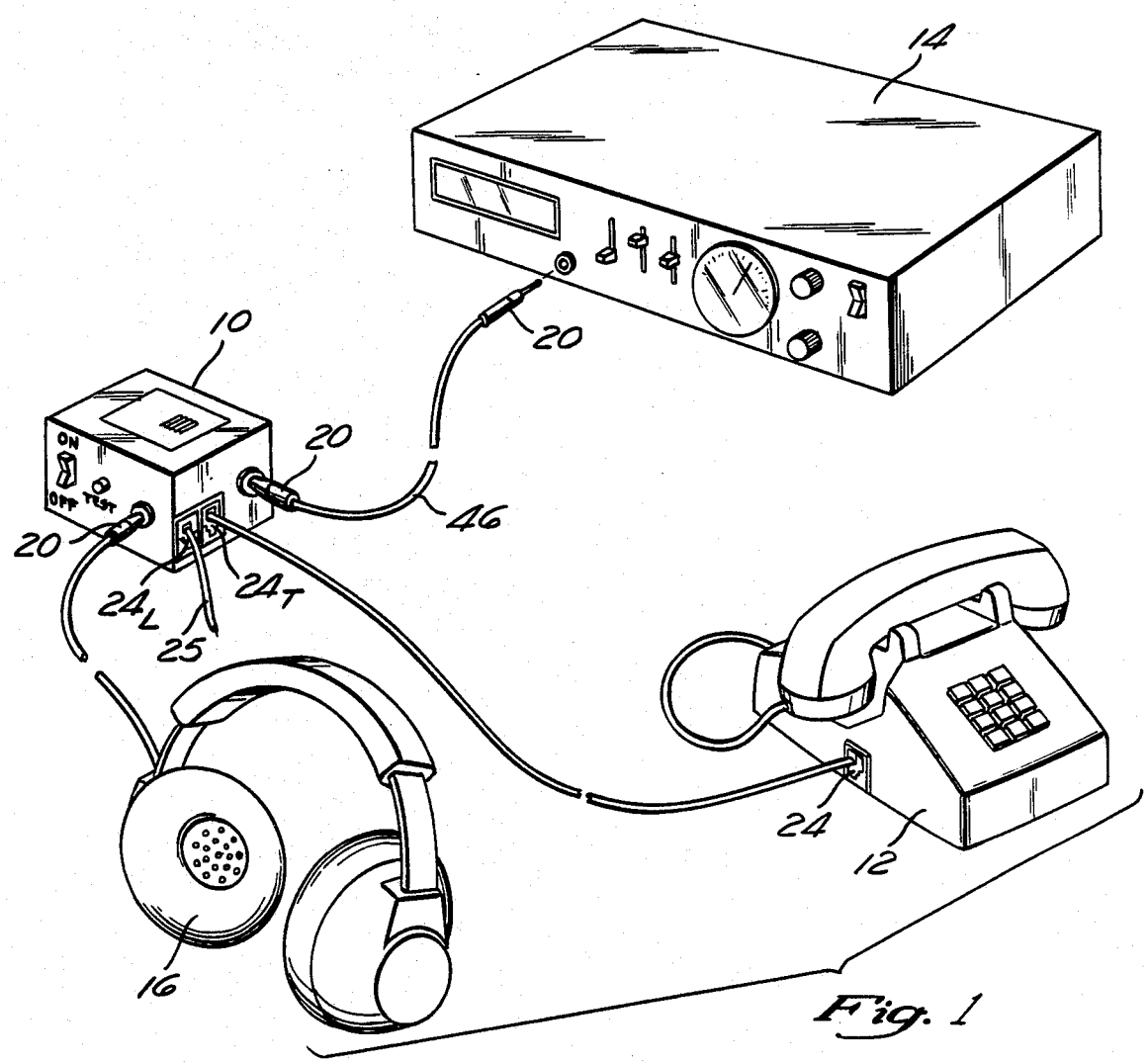
FIG. 1 is a perspective view of the stereo interface telephone ring detector apparatus of the present invention connected to a conventional telephone, stereo unit, and stereo headphone set.

Referring to FIG. 1, there is shown the stereo interface telephone ring detector device 10 of the present invention disposed between a conventional telephone 12, stereo amplifier/receiver unit 14, and stereo headphone set 16. The apparatus 10 is connected to the amplifier/receiver unit 14 and headphone set 16 by standard stereo plug connectors 20 and 22, respectively, and to the telephone 12 and telephone line 25 by a pair of conventional T-type phone jacks $24_T$ and $24_L$, respectively. As such, the apparatus 10 of the present invention may be quickly and easily manually installed or connected into the operative system by a user.

Figure 2:
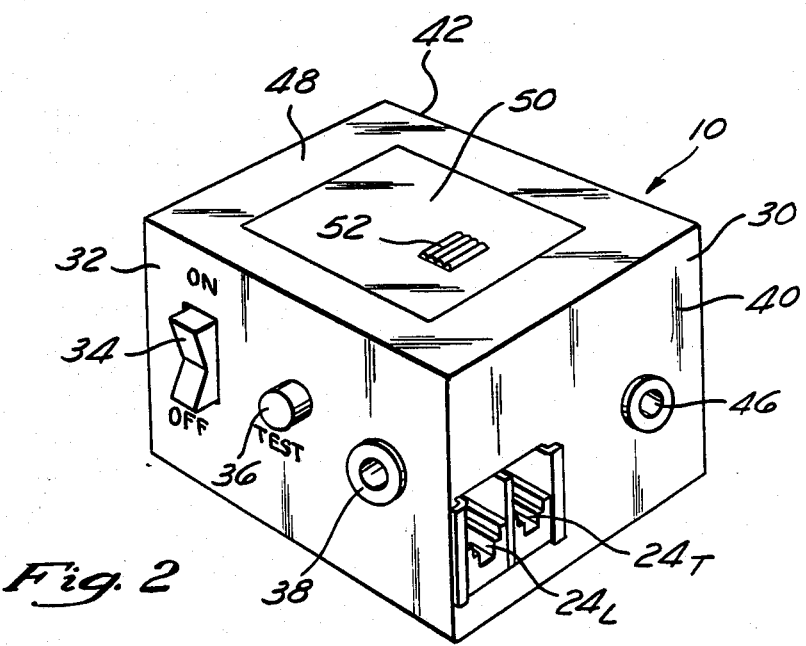
FIG. 2 is an enlarged perspective view of the apparatus of the present invention illustrating the preferred housing configuration and control locations.

As shown in FIG. 2, the apparatus 10 is formed having a compact rectangular-shaped housing 30 sized to be approximately $3 \times 2\frac{1}{2} \times 2$ inches. The particular configuration of the housing 30 is disclosed merely as by way of example with differing shaped housing configurations being fully contemplated herein. In the preferred embodiment, the front surface 32 of the housing 30 is provided with an on/off toggle switch 34, test switch 36, and female headphone jack 38 while the side wall panel 40 (or rear panel 42) includes a pair of female T-type phone jacks $24_L$ and $24_T$ and a stereo lead 46. The upper surface 48 of the housing 30 includes an access panel 50 which is removably mounted by way of a thumb latch 52 to expose a conventional 9-volt transistor battery (not shown). With the toggle switch 34, test switch 36, and headphone jack 38 being positioned on separate side walls of the housing 30 from the telephone jack 24 and stereo leads 46, it will be recognized that the leads extending to the telephone 12, telephone line 25, and stereo unit 14 may be advantageously concealed from sight with only the front surface 32 of the housing 30 being directly viewed by a user.

Figure 3:
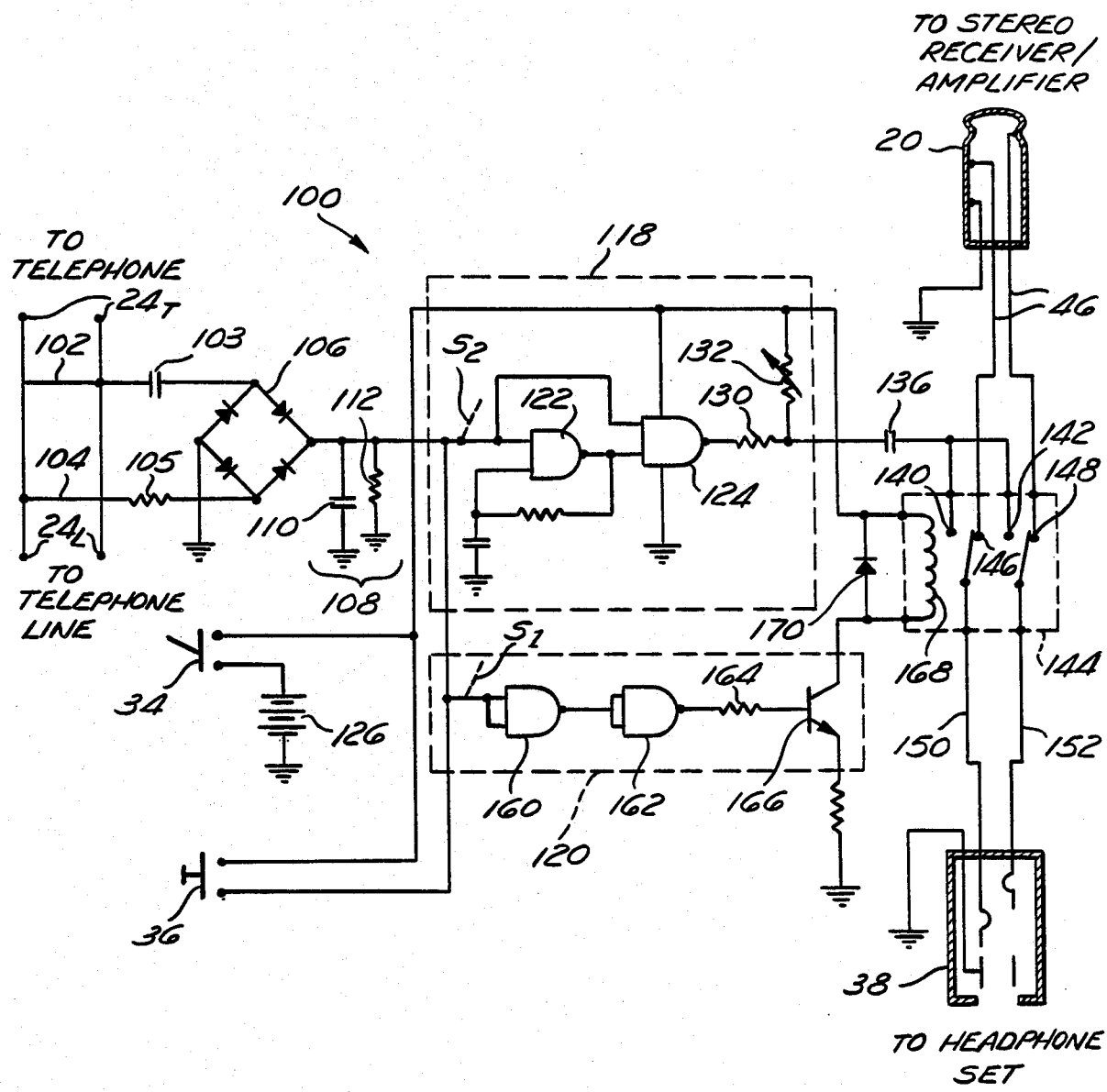
FIG. 3 is a schematic diagram of the internal electrical circuitry of the apparatus of the present invention.

Referring to FIG. 3, the detailed construction of the control circuit 100 maintained within the housing 30 may be described. As shown, the telephone jacks $24_L$ and $24_T$ provide a pair of terminals 102 and 104 which are connected through a capacitor 103 and resistor 105, respectively, to a 4-diode bridge rectifier 106. The rectifier 106 is connected to a suitable filtering network 108 composed of a parallel arranged capacitor 110 and resistor 112, which converts the rectified alternating current (AC) ring signal to a direct current. This filtered DC signal is applied to both the upper and lower branches 118 and 120 (indicated by phantom line perimeters in FIG. 3) of the circuit 100, which compose a tone generating circuit and switching circuit, respectively.

The tone generating circuit 118 includes an integrated circuit oscillator 122 and an integrated circuit modulator 124 (such as a CD4093 integrated circuit manufactured by RCA and/or Motorola). The filtered telephone ring signal is applied to the oscillator 122 to generate a tone signal which is supplied to the modulator 124. As shown, the modulator 124 is powered by connection to a 9-volt transistor battery 126 through the on/off toggle switch 34. A resistor 130 is connected in series with the output of the modulator 124, and a resistor 132 connects the resistor 130 to the output of the 9-volt battery 126 so that the ratio between these two resistors 130 and 132 determines the volume of the modulated tone signal produced by the oscillator 122 and modulator 124. The resistor 132 is preferably preadjusted, during manufacture, or, alternatively, adjustable by a user, to permit the volume of the tone signal to be matched with the impedance of the particular headphone set 16.

The output from the modulator 124 is connected through a capacitor 136 to a left and right channel tone contact 140 and 142, respectively, of a double-pole, double-throw relay 144 (indicated by the phantom perimeter in FIG. 3) which is coupled to the left and right channels 150 and 152 of the female headphone jack 38. The relay 144 additionally includes a left and right channel stereo contact 146 and 148, respectively, which are connected by stereo leads 46 and jack 20 to the stereo amplifier and receiver unit 14. As such, it will be recognized that, with the relay 144 positioned to close the left and right channel stereo contacts 146 and 148, the stereo music signal from the stereo unit 14 is applied to the headphone jack 38; whereas, with the relay 144 positioned to close the left and right channel tone contacts 140 and 142, respectively, the tone signal from the oscillator 122 and modulator 124 is applied to the headphone jack 38.

The lower branch or switching portion 112 of the circuit 100 is composed of a pair of integrated circuit drivers 160 and 162 which are connected in series to the filtered voltage signal. The drivers 160 and 162 are connected in series with a current limiting resistor 164, and power a switching transistor 166 (such as a 2N222 manufactured by National) coupled to the drive coil 168 of the relay 144. When driven by the drivers 160 and 162, the switching transistor 166 energizes the coil 168, causing the relay 144 to switch from the stereo channel contacts 146 and 148 to the tone channel contacts 140 and 142. To eliminate any transient signals which might damage the transistor 166, a clamping diode 170 shunts the coil 168.

A momentary test switch 136 is additionally provided in the circuit 100 which selectively connects the 9-volt transistor battery 126 to both the tone generating and switching branches 118 and 120, respectively, of the circuit. By manual depression of the switch 36, the relay 144 is driven from the stereo channel contacts 146 and 148 to the tone channel contacts 140 and 142, whereby the tone generated through the oscillator 122 and modulator 124 is selectively connected to the headphone jack 38.

With this structure defined, the operation of the circuit 100 of the present invention may be described. For purposes of illustration, it will be assumed that the apparatus 30 has been previously connected in a manner previously described to the stereo amplifier and receiver unit 14, telephone 12, telephone line 25, and headphone 16. Connected in such a manner, initial manual activation of the on/off toggle switch 34 causes the 9-volt transistor battery 126 to be applied to the tone generating portion 118 of the circuit 100. However, due to the lack of an incoming telephone signal and thus, the lack of a voltage signal being applied to the switching branch 120 of the circuit 100, the switching transistor 166 remains in an undriven or normal position, such that the relay 144 connects the stereo signal from the stereo unit 14 to the output headphone jack 38 and headphone set 16. As such, the user may listen to the stereo signal from the stereo amplifier and receiver unit 14 on the headphone set 16.

When an incoming telephone ring signal is applied to the terminals 102 and 104 (typically being at a value of approximately 150 volts and 20 hertz), the telephone ring signal is rectified through the rectifier 106 and applied to the filter network 108. The rectified AC telephone ring voltage signal is converted to DC voltage by the capacitor 110 of the filtering network 108, and applied simultaneously to both the tone generating branch 118 and switching branch 120 of the circuit 100. A tone signal is generated in the upper branch 118 by the oscillator 122 and modulator 124 and applied to the left and right channel tone contacts 140 and 142 of the relay 144. Simultaneously, in the lower branch 120 of the circuit 100, the drivers 160 and 162 power the switching transistor 166 to energize the coil 168 of the relay 144 and cause the relay to switch from the stereo signal contacts 146 and 148 to the tone contacts 140 and 142. As such, the stereo signal is interrupted and the generated tone signal is applied to the stereo headphone set 16 to alert the user of the incoming telephone call.

Feedback isolation within the circuit 100 is provided by the capacitor 103, located between the incoming telephone signal and the rectifier 106, which blocks DC voltages from being applied to the telephone line 25 and prevents loading of the telephone line such that normal conversation signals may be transmitted by the telephone 12 during operation. Additionally, the resistor 105 on the telephone lead terminal 104 provides current limitations to transient signals, or DC, in the event of failure of the capacitor 103, while the rectifier 106 blocks any shorts or ground faults developed in the circuit 100 from migrating back into the telephone line.

Those skilled in the art will recognize that the circuit 100 of the present invention may be adapted such that the tone produced by the oscillator 122 and modulator 24 is applied directly over the stereo signals. Such modification may be accomplished merely by the incorporation of a switch $S_1$ (indicated by the phantom lines in FIG. 3) located upline from the driver 160 of the switching branch 120 of the circuit 100. With the switch $S_1$ maintained in an open position, the lower or switching branch 120 is, in effect, eliminated from the circuit 100. Additionally, the modulator 124 output must be directly connected to the stereo contacts 146 and 148, respectively. However, with such a modification, the output tone signal from the modulator 124 should be coupled independently to both the left and right channel stereo contacts 146 and 148 through a respective capacitor (not shown) (analogous to capacitor 136 in FIG. 3), to eliminate any cross-talk between the channels of the stereo unit 14.

Further, it will be recognized that the present invention may additionally be adapted to merely interrupt the stereo signal in response to an incoming phone signal, using only the lower branch or switching portion 120, in combination with the relay 144. This modification may be accomplished by the incorporation of a switch $S_2$ (indicated by the phantom line in FIG. 3), located upstream from the oscillator 122 of the tone generating branch 118 of the circuit 100. With the switch $S_2$ maintained in an open position, the tone generating branch 118 is, in effect, eliminated from the circuit 100, with the rectified DC telephone voltage being merely utilized to power the drivers 160 and 162 and transistor 166 to interrupt the stereo signal applied to the headphone set 16 in response to an incoming telephone call.

Further, because the relay 144 is normally positioned to connect the stereo signal contacts 144 and 146 to the output jack 38 and thus the headphone set 16, it will be recognized that the device 30 of the present invention may be left installed upon the telephone 12 and stereo unit 14 without effecting the normal operation of the stereo unit 14. As such, with the device 30 turned off, a user may listen to the stereo signal directly through the device 30 and headphone set 16.

I claim:

1. A method of audibly alerting a headphone listener to an incoming telephone call comprising the steps of:
    forming an electrically connected interface directly between a headphone set, a telephone line and an amplifier;
    electrically detecting directly upon said telephone line the presence of an increased voltage signal generated by said incoming telephone call;
    generating a tone signal in response to the detection of said incoming telephone call;
    applying said tone signal to said headphone set; and
    automatically momentarily interrupting the normal signal from said amplifier applied to said headphone set when said tone signal is applied to said headphone set, said detecting step further comprising the step of rectifying said increased voltage signal generated by said incoming telephone call, said generating step further comprising the steps of applying said rectified voltage signal to an oscillator and modulating the output from said oscillator to produce a modulated tone signal, and
    said automatic interrupting step comprising the further steps of
    applying said rectified voltage signal to drive a switching transistor; and
    switching a relay in response to said driving of said switching transistor to selectively connect said modulated tone signal to said headphone set.

2. The method of claim 1 further comprising the step of adjusting the volume level of said modulated tone signal applied to said headphone set.

* * * * *